Aug. 17, 1965

F. G. ADAM 3,201,664

SEMICONDUCTOR DIODE HAVING MULTIPLE REGIONS OF DIFFERENT CONDUCTIVITIES

Filed March 5, 1962

4 Sheets-Sheet 1

INVENTOR
FRITZ G. ADAM
BY Philip M. Bolton
ATTORNEY

INVENTOR
FRITZ G. ADAM
BY Philip M. Bolton
ATTORNEY

INVENTOR
FRITZ G. ADAM
BY Philip M. Bolton
ATTORNEY

Aug. 17, 1965 F. G. ADAM 3,201,664

SEMICONDUCTOR DIODE HAVING MULTIPLE REGIONS OF DIFFERENT CONDUCTIVITIES

Filed March 5, 1962 4 Sheets-Sheet 4

INVENTOR
FRITZ G. ADAM
BY Philip M. Bolton
ATTORNEY

United States Patent Office
3,201,664
Patented Aug. 17, 1965

3,201,664
SEMICONDUCTOR DIODE HAVING MULTIPLE REGIONS OF DIFFERENT CONDUCTIVITIES

Fritz Gunter Adam, Aldwych, London, England, assignor to International Standard Electric Corporation, New York, N.Y., a corporation of Delaware
Filed Mar. 5, 1962, Ser. No. 177,427
Claims priority, application Great Britain, Mar. 6, 1961, 8,084/61
6 Claims. (Cl. 317—234)

Figure 1:
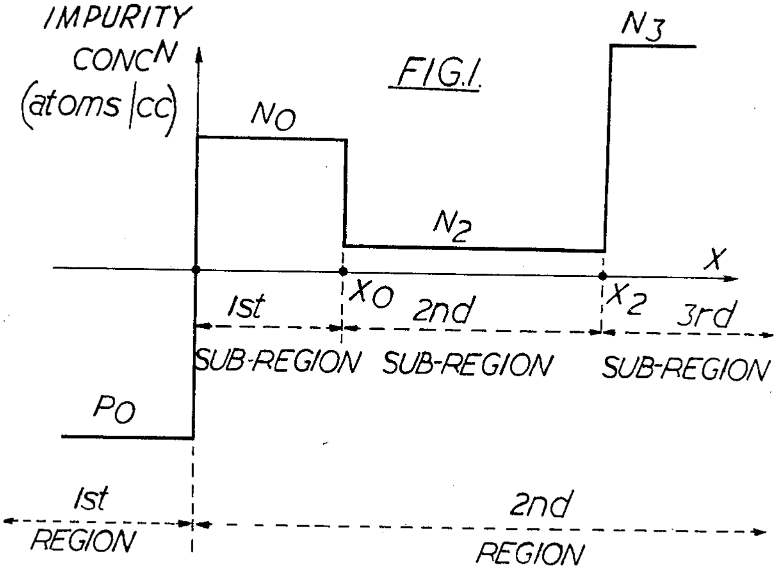

The present invention relates to semiconductor diodes.

At the junction between the p- and n-type regions of a semiconductor diode there exists a narrow intermediate region in which there are practically no free charge carriers. Accordingly, although the fixed charges of the ionised donors and acceptors compensate one another over the region as a whole, there is a net positive or negative space charge at any particular part of the intermediate region, which is therefore known as a "space charge region."

In the absence of any external voltage applied to the junction the width of the space charge region depends on the composition of the p- and n-regions on either side. Moreover, since it consists of a region containing no free charge carriers sandwiched between two regions containing large members of such carriers the space charge region acts in many ways like a parallel plate condenser. If a reverse bias is applied to the junction, free charge carriers are removed from those parts of the p- and n-regions adjacent to the space charge region, which therefore increases in width, i.e.—its capacitance is decreased.

The exact relationship between the voltage across the junction and its capacitance depends on the distribution of donors and acceptors in those parts of the p- and n-regions in the neighbourhood of the junction.

The present invention provides a semiconductor diode having a first region of one conductivity type material and a second region of the opposite conductivity type material, the said second region containing a first, a second and a third sub-region in order of increasing distance from the junction between the first and second regions, the said second sub-region having a lower conductivity than the said first and third sub-regions, the said junction and the transitions between the sub-regions being abrupt.

By an "abrupt" junction or transition is meant one at which at least 50% of the change from the impurity concentration of one region or subregion to the impurity concentration of another region or sub-region occurs within a distance of less than $10^{-5}$ cms.

The invention will now be more particularly described with reference to the accompanying drawings, illustrating structures of two preferred embodiments, together with graphs and diagrams of characteristics.

Figure 2:
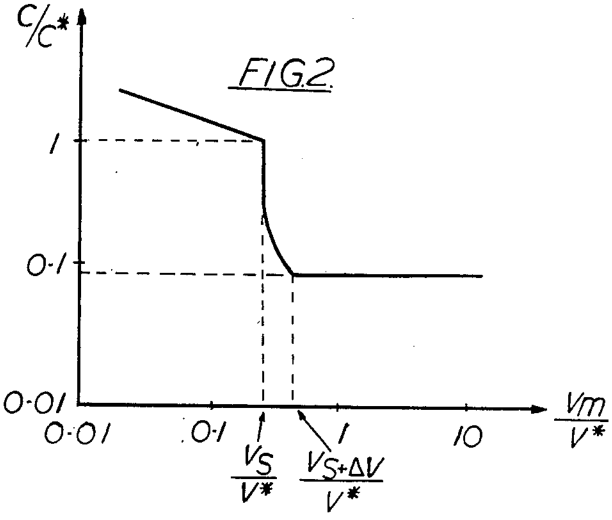
Figure 3:
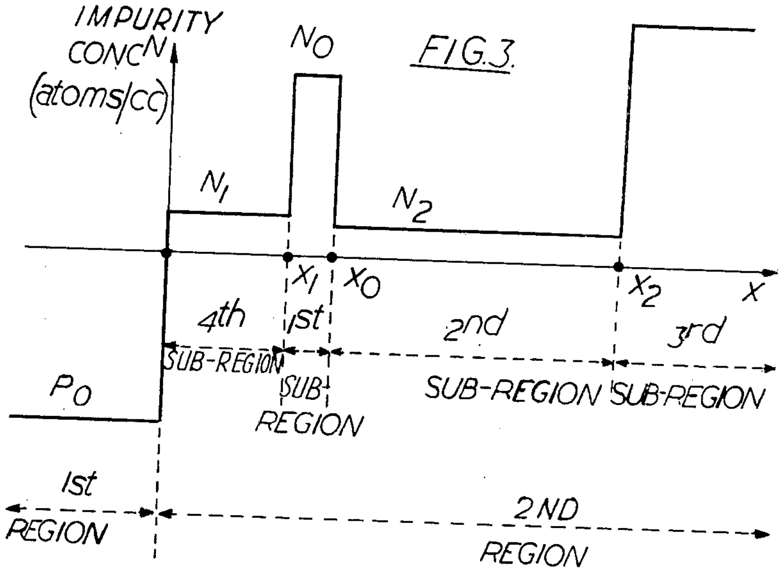
Figure 4:
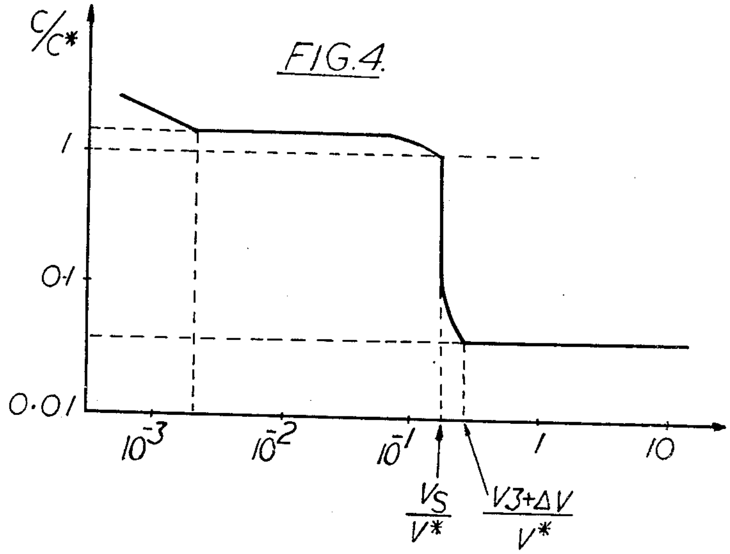
Figure 5:
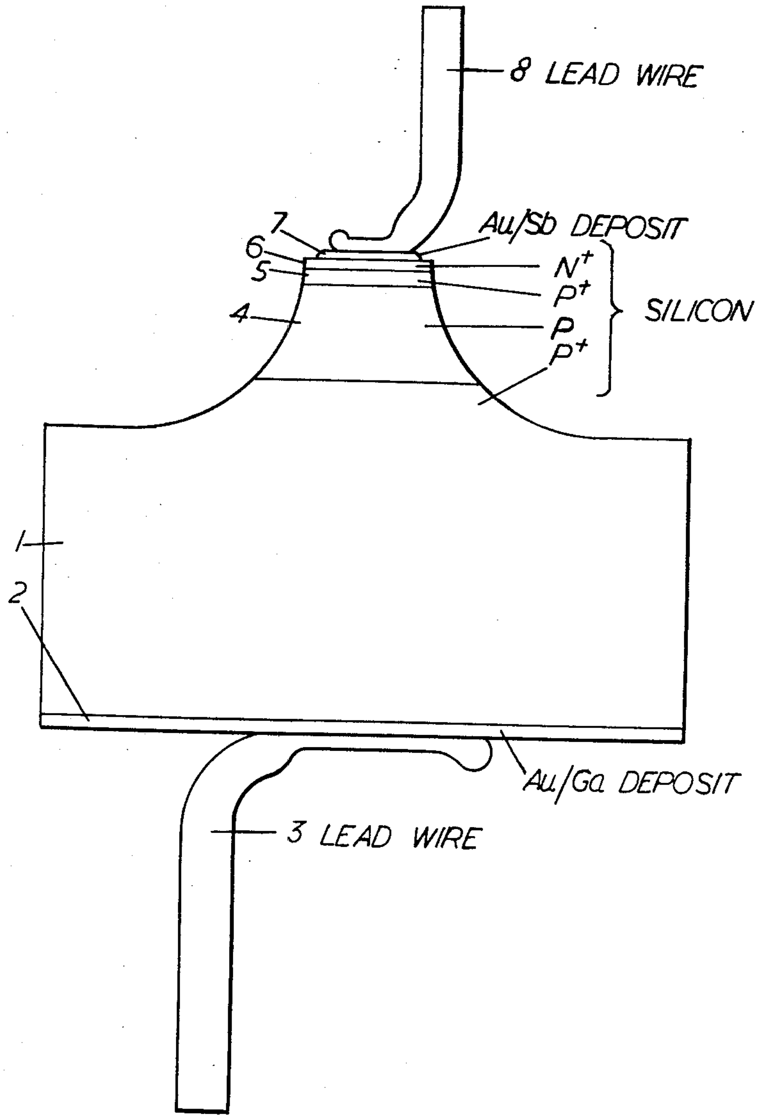
Figure 6:
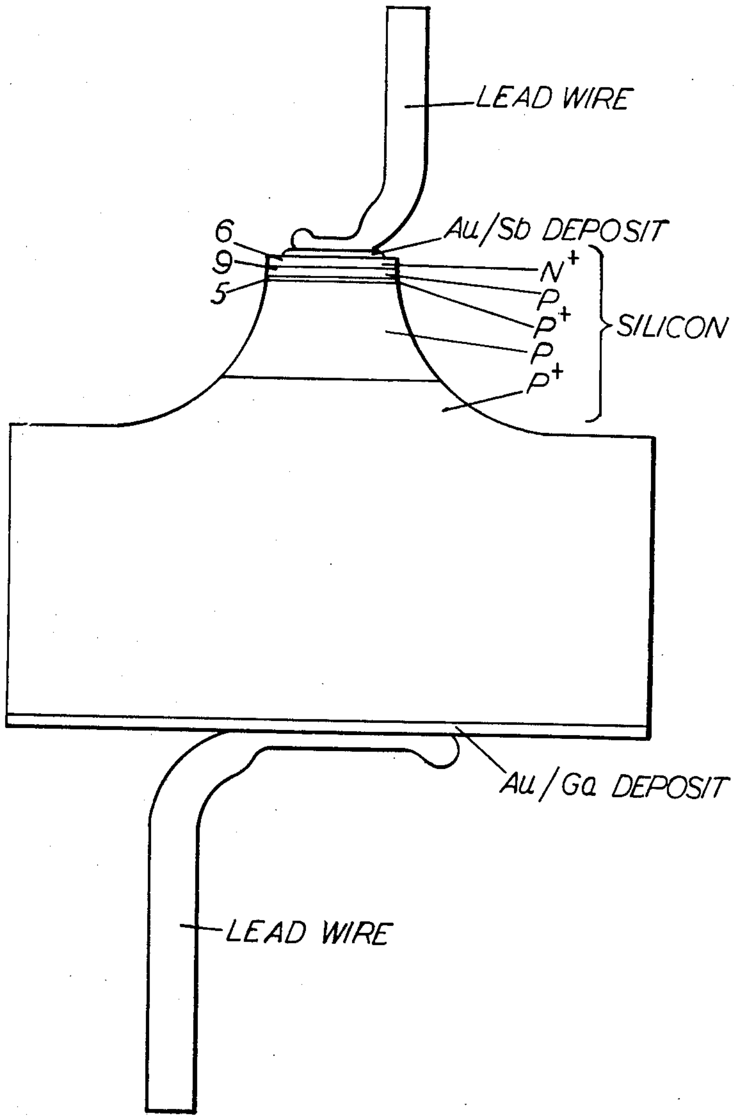

In the drawings:

FIGS. 1 and 3 are sketches of the variation of impurity concentration with distance in two semiconductor diodes according to the present invention;

FIGS. 2 and 4 illustrate the manner in which the capacitance of the p-n junctions of the semiconductor diodes of FIGS. 1 and 3, respectively, varies with applied bias; and FIGS. 5 and 6 show sections through mesa-type structures of two multilayer semiconductor devices, FIG. 5 showing a 4-layer structure and FIG. 6 a 5-layer structure.

The structure shown in FIG. 5 shows a number of layers of semi-conductor material. Constituting the sub-regions referred to above, which together make up the first or second main regions of p- or n-type conductivity, as the case may be. In FIG. 5, a wafer 1 of highly doped p-type silicon provides the substrate, to which there is applied, by plating or evaporating for example, a deposit 2 of a gold-gallium alloy to provide intimate ohmic contact between the lead wire 3 and the substrate 1. Any of the known appropriate techniques for affixing lead wires, such as compression bonding, may be employed here. In the embodiment illustrated in FIG. 5, the substrate is the third of three sub-regions making up the said second region, the other two being adjacent to it. The second sub-region 4 is of high purity p-type silicon which is preferably grown onto the substrate 1 by an epitaxial process. The layer 5 provides the first sub-region and may be grown onto the second sub-region by a similar process, but with an appreciably greater p-type impurity content than prevails in the second sub-region. Adjacent to this first sub-region, applied by epitaxy or diffused into it, is a layer 6 which provides the said first region, and is of heavily doped n-type silicon material. A deposit 7 of a gold-antimony alloy is arranged between the lead wire 8 and the layer 6 to facilitate the provision of a good ohmic contact.

The structure shown in FIG. 6 differs from that already described with reference to FIG. 5 only by the addition of a fourth sub-region 9 between the aforementioned first region 6 and the first sub-region 5. This fourth sub-region is rather lightly doped silicon material of the same conductivity type as the other three sub-regions and is also preferably grown epitaxially onto the first sub-region 5.

It will be appreciated by those skilled in the art that a structure capable of achieving similar results can be obtained by using n-type doping wherever in the two preceding paragraphs p-type doping is referred to and vice versa. However, when a structure of the opposite type to that described is employed the deposits 2 and 7 will then need to be of a gold-antimony and a gold-gallium alloy, respectively.

Although mesa type structures have been employed and illustrated, a structure of the mesa type is not an essential feature of the invention.

The degrees to which the various layers of semiconductor material are doped and their thicknesses are the subject of the following more detailed theoretical description.

The manner in which the capacitance of a p-n junction varies with the bias applied across the junction can be calculated in the following manner for the case of an impurity distribution varying according to the function $N(x)$, where the $x$ is a distance measured along an axis at right angles to the plane of the junction:

The dynamic capacitance per unit area of a space charge layer can be defined as $$C=\left|\frac{dQ_n}{dV_a}\right. \tag{1}$$

where $dQ_n$ is the charge variation per unit area on the n-side of a p-n junction, when the applied voltage varies from $V_a$ to $V_a+dV_a$. Now $dQ_n$ is added or subtracted at the boundary of the space charge region at a distance $L_n$ from the junction and consists almost completely of the net charge of donors and acceptors being included in, or excluded from, this region due to variation of the space charge depth. This variation is given by $$dL_n-\frac{dL_n}{dV_a}dV_a$$

One can therefore express $$dQ_n=qN\ (L_n)dL_n \tag{2}$$

or:

$$dQ_n = \left| \frac{qN(L_n)dV_a}{\frac{dV_a}{dL_n}} \right| \qquad (2a)$$

where $N(x) = N_D(x) - N_A(x)$ = net concentration of ionised impurity atoms. Inserting (2a) into (1), we obtain for the capacity $$C = \frac{qN(L_n)}{dV_a/dL_n} \qquad (3)$$

In order to derive the applied voltage $V_a$ as a function of $L_n$, the depletion layer width on the n-side, we make the following assumptions:

$$N(x) > 0 \text{ for } x > 0 \text{ (n-type)}$$
$$N(x) < 0 \text{ for } x < 0 \text{ (p-type)}$$

Otherwise the net impurity density $N(x)$ may be arbitrary, but integrable. As in Equation 2 we neglect throughout the contribution of the mobile carriers of the space charge. This should be a good approximation, at least as long as reverse voltages $V_a$ greater than the built in voltage $V_i$ are considered.

Then, for the potential V in the space charge region the Poisson equation holds in the simple form:

$$\frac{d^2V}{dx^2} = \frac{-q}{k\epsilon_0} N(x) \qquad (4)$$

Integrating once gives:

$$\frac{dV}{dx} = \frac{-q}{k\epsilon_0} \int_0^x N(x)dx + A$$

Boundary conditions are:

$$\frac{dV}{dx} = 0 \begin{cases} \text{for } x = L_n & (5a) \\ \text{and } x = -L_p & (5b) \end{cases}$$

Using (5a) one finds:

$$A = \frac{q}{k\epsilon_0} \cdot \int_0^{L_n} N(x)dx$$

and $$\frac{dV}{dx} = \frac{q}{k\epsilon_0} \cdot \int_x^{L_n} N(x)dx \qquad (6)$$

Inserting (5b) into (6) one obtains the overall charge neutrality condition:

$$\int_{-L_p}^{L_n} N(x)dx = 0 \qquad (7)$$

A further integration of (6) leads to $$V(x) = \frac{q}{k\epsilon_0} \int_0^x \left\{ \int_x^{L_n} N(x)dx \right\} dx \qquad (8)$$

assuming that $V=0$ for $x=0$. The total potential drop across the reversed biased junction is therefore $$V_m = |V(L_n)| + |V(-Lp)|$$

or $$V_m = \frac{q}{k\epsilon_0} \int_{L_p}^{L_n} \left\{ \int_x^{L_n} N(x)dx \right\} dx \qquad (9)$$

One can now calculate $dV_m/dL_n$, and since $$V_m = V_a + Vi \qquad (10)$$

and the built-in voltage $V_i$ is a constant, it is $$\frac{dV_m}{dL_n} = \frac{dV_a}{dL_n}$$

By differentiating Equation 9 one obtains $$\frac{dV_a}{dL_n} = \frac{q}{k\epsilon_0} N(L_n)(L_n + L_p) \qquad (11)$$

Finally, by inserting (11) into (3), one finds the capacity $$C = \frac{K\epsilon_0}{L_n + L_p} = \frac{K\epsilon_0}{L} \qquad (12)$$

$L_p$ can be calculated from (7) as a function of $L_n$, and then $L_n$ from (9) as a function of $V_m$. Inserting this into (12) and observing (10) leads to the relationship between the capacity C and the applied voltage $V_a$.

As an alternative to Equation 9, above, it may be an advantage to use the alternative formula:

$$V_m = \frac{q}{K\epsilon_0} \int_{-L_p}^{L_n} xN(x)dx \qquad (13)$$

Considering now the semiconductor diode whose variation of impurity concentration is shown in FIG. 1, this contains a first region of p-type semiconductor material having P0 acceptor atoms/cc. and a second region of n-type conductivity. The second region consists of three subregions, a first subregion of width $x_0$ cms., containing $N_0$ donor atoms/cc., a second subregion of width $(x_2 - x_0)$ cms., containing $N_2$ donor atoms/cc., and a third subregion containing $N_3$ donor atoms/cc. As indicated in FIG. 1, the concentration of donor atoms in the second subregion is less than the concentration of donor atoms in the first subregion.

The function $N(x)$ for this embodiment is therefore given by:

$$N(x) \begin{cases} P_0 \text{ for } x < 0 \\ N_0 \text{ for } 0 \leq x \leq x_0 \\ N_2 \text{ for } x_0 \leq x \leq x_2 \\ N_3 \text{ for } x > x_2 \end{cases}$$

Further, $N_0 > N_2$ and $N_3 > N_0$, and if $P_0 >> N_0$ the first region is so heavily doped than one can, according to (7), neglect $L_p$. Application of Equation 13 with $L_p = 0$ leads to:

$$\frac{V_m}{V^*} = \begin{cases} \frac{1}{2}\left(\frac{L}{x_0}\right)^2 \text{ for } 0 \leq L \leq x_0 \\ \frac{1}{2}\left[1 + \frac{N_2}{N_0}\left\{\left(\frac{L}{x_0}\right)^2 - 1\right\}\right] \text{ for } x_0 \leq L \leq x_2 \\ \frac{1}{2}\left[1 + \frac{N_2}{N_0}\left\{\left(\frac{x_2}{x_0}\right)^2 - 1\right\} + \frac{N_3}{N_0}\left\{\left(\frac{L}{x_0}\right)^2 - \left(\frac{x_2}{x_0}\right)^2\right\}\right] \text{ for } 1 \gtrless x_2 \end{cases}$$

where $$V^* = \frac{q}{k\epsilon_0} N_0 x_0^2$$

The relationship between the capacitance of the junction and the applied voltage is obtained by using these equations in conjunction with Equation 12, above. The result is shown in FIG. 2 in which $c/c^*$, where $$C^* = \frac{k\epsilon_0}{x_0}$$

is plotted against $^v m/V^*$.

It will be seen from FIG. 2 that the capacitance of the junction initially falls slowly with increasing reverse bias. However, when the voltage across the junction reaches a certain voltage, $V_s$, there is a sudden fall in capacitance, and for a small voltage change $\Delta V$ the capacitance falls by a factor of 10.

In one device having an impurity distribution as shown in FIG. 1 the dimensions and impurity concentrations of the various regions and subregions are as follows:

| | | |
|---|---|---|
| $x_0 = 3\mu$ | $N_0 = 10^{15}$ cm.$^{-3}$ | $V^* = 13.5$ volts |
| $x_2 = 15\mu$ | $N_2 = 10^{12}$ cm.$^{-3}$ | $C^* = 3530$ pf./cm.$^2$ |
| | $N_3 >> N_0$ | |

This device has the following properties:

| | |
|---|---|
| $V_s = 6.75$ volts | $C$ (at 6.75 volts) $= 3530$ pf./cm.$^2$ |
| $\Delta V = 0.16$ volt | $C$ (at 6.91 volts) $= 706$ pf./cm.$^2$ |

A further device made according to FIG. 1 has the following dimensions and impurity concentrations:

| | | |
|---|---|---|
| $x_0 = 1\mu$ | $N_0 = 10^{16}$ cm.$^{-3}$ | $V^* = 15$ volts |
| $x_2 = 10\mu$ | $N_2 = 10^{13}$ cm.$^{-3}$ | $C^* = 10{,}600$ pf./cm.$^2$ |
| | $N_3 >> N_0$ | |

Its properties are as follows:

$V_s=7.5$ volts  $C$ (at 7.5 volts)$=10{,}600$ pf./cm.$^2$
$\Delta V=0.75$ volt  $C$ (at 7.5 volts)$=10{,}600$ pf./cm.$^2$ Turning now to FIG. 3, this shows the variation of impurity concentration in a further semiconductor diode according to the invention. In this case the diode has a first region of p-type conductivity material containing $P_0$ acceptor atoms/cc. and a second region of n-type conductivity. With the second region are first, second, third, and fourth subregions containing $N_0$, $N_2$, $N_3$ and $N_1$ donor atoms/cc., respectively, the concentration of donor atoms in the second subregion being less than the concentration in both first and third subregions. The first, second and fourth subregions have widths of $(x_0-x_1)$, $(x_2-x_0)$ and $x_1$ cms., respectively.

The function $N(x)$ for this embodiment is given by:

$$N(x)=\begin{cases}-P_0 \text{ for } x<0\\ N_1 \text{ for } 0\leq x\leq x_1\\ N_0 \text{ for } x_1\leq x\leq x_0\\ N_2 \text{ for } x_0\leq x\leq x_2\\ N_3 \text{ for } x\geq x_2\end{cases}$$

Further, $N_0>N_1$, $N_0>N_2$ and $N_3>N_2$, and assuming that $P_0>>N_1$ the first region is so heavily doped that one can, according to (7), neglect $L_p$. Application of Equation 13 with $L_p=0$ leads to:

$$\frac{V_m}{V^*}\begin{cases}\frac{1}{2}\ \frac{N_1}{N_0}\left(\frac{L}{x_0}\right)^2 \text{ for } 0\leq L\leq x_1\\ \frac{1}{2}\left[\frac{N_1}{N_0}\left(\frac{x_1}{x_0}\right)^2+\left(\frac{L}{x_0}\right)^2-\left(\frac{x_1}{x_0}\right)^2\right] \text{ for } x_1\leq L\leq x_0\\ \frac{1}{2}\left[\frac{N_1}{N_0}\left(\frac{x_1}{x_0}\right)^2+1-\left(\frac{x_1}{x_0}\right)^2+\frac{N_2}{N_0}\left\{\left(\frac{L}{x_0}\right)^2-1\right\}\right] \text{ for } x_0\leq L\leq x_2\\ \frac{1}{2}\left[\frac{N_1}{N_0}\left(\frac{x_1}{x_0}\right)^2+1-\left(\frac{x_1}{x_0}\right)^2+\frac{N_2}{N_0}\left\{\left(\frac{x_2}{x_0}\right)^2-1\right\}\right.\\ \qquad\left.+\frac{N_3}{N_0}\left\{\left(\frac{L}{x_0}\right)^2-\left(\frac{x_2}{x_0}\right)^2\right\}\right] \text{ for } L\leq x_2\end{cases}$$

As above, the relationship between the capacitance of the junction and the applied voltage is obtained by using these results and Equation 12, above. FIG. 4 shows $C/C^*$ plotted against $V_m/V^*$.

As in FIG. 2 there is a certain voltage $V_s$ in FIG. 4 at which the capacitance of the junction suddenly falls, by a factor of 10 or more.

In one device having an impurity distribution according to that shown in FIG. 3 the dimensions and impurity concentrations are as follows:—

| | | |
|---|---|---|
| $x_0=10\mu$ | $N_1=2\times10^{13}$ cm.$^{-3}$ | $V^*=150$ volts |
| $x_1=9\mu$ | $N_0=10^{15}$ cm.$^{-3}$ | $C^*=1060$ pf./cm.$^2$ |
| $x_2=30\mu$ | $N_2=10^{12}$ cm.$^{-3}$ | |
| | $N_3>>N_0$ | |

Its properties are:

$V_s=15$ volts  $C$ (at 15 volts) $=1060$ pf./cm.$^2$
$\Delta V=0.6$ volts  $C$ (at 15.6 volts)$=353$ pf./cm.$^2$ The narrow subregions of the diodes illustrated in FIGS. 1 and 3 can be made by the process of epitaxial growth, as described above in connection with FIGS. 5 and 6.

In consideration of the choice of voltage range for the range in which the capacitance of the device is highly sensitive to changes in the applied voltage, it must of course be bourne in mind that the breakdown voltage of the device will set an upper limit to its operating range.

It is to be understood that the foregoing description of specific examples of this invention is not to be considered as a limitation on its scope.

What I claim is:

1. A semiconductor diode comprising a first region of one conductivity type material and a second region of the opposite conductivity type material, said second region comprising a first, a second and a third subregion in order of increasing distance from the junction between said first and second regions, said first region and each subregion having relatively constant predetermined impurity concentrations therein different from each adjacent subregion, said second subregion being of a lower conductivity and impurity concentration than said first and third subregions, and a pair of electrodes making low resistance connections to said first region and third subregion.

2. A semiconductor diode according to claim 1 wherein said first region is of higher conductivity than any part of said second region.

3. A semiconductor diode according to claim 1 wherein said second region further includes a fourth subregion, said fourth subregion being situated between said junction and said first subregion and being of a lower conductivity and impurity concentration than said first subregion, and said third subregion forming the substrate for the other subregions.

4. A semiconductor diode according to claim 1 wherein said subregions in said second region are in the form of epitaxial layers.

5. A voltage variable capacitor comprising:
a semiconductor diode including
 a first region of one conductivity type material;
 a second region, adjacent to said first region, of the opposite conductivity type material, said second region comprising a first, a second, and a third subregion in order of increasing distance from the junction between said first and second regions, said first region and each subregion having relatively constant predetermined impurity concentrations therein different from each adjacent subregion, said second subregion being of lower conductivity and impurity concentration than said first and third subregions;
 a space charge region at the junction of said first and second regions;
a first electrode making low resistance connection to said first region;
a second electrode making low resistance connection to said third subregion, said electrodes forming connections to apply a reverse bias voltage across said semiconductor diode, said junction having a characteristic capacitance which decreases by a factor of 10 after application of a predetermined reverse voltage.

6. A voltage variable capacitor comprising:
a semiconductor diode including
 a first region of one conductivity type material;
 a second region, adjacent to said first region, of the opposite conductivity type material, said second region comprising a fourth, a first, a second, and a third subregion in order of increasing distance from the junction between said first and second regions, said first region and each said subregion having relatively constant predetermined impurity concentrations therein different from each adjacent subregion, said second and fourth subregions being of lower conductivity and impurity concentration than said first and third subregions;
 a space charge region at the junction of said first and second regions;
a first electrode making low resistance connection to said first region;
a second electrode making low resistance connection to said third subregion, said electrodes forming connections to apply a reverse bias voltage across said semiconductor diode, said junction having a characteristic capacitance which decreases by a factor of 10 after application of a predetermined reverse voltage.

(References on following page)

References Cited by the Examiner

UNITED STATES PATENTS

| | | | |
|---|---|---|---|
| 2,692,839 | 10/54 | Christensen et al. | 148—175 |
| 2,763,581 | 9/56 | Freedman | 148—1.5 |
| 2,878,152 | 3/59 | Runyan | 148—33 |
| 2,913,676 | 11/59 | Pankove | 317—235 |
| 2,914,715 | 11/59 | Uhlir | 317—234 |
| 2,952,804 | 9/60 | Franke | 148—1.5 |
| 2,980,830 | 4/61 | Shockley | 317—235 |
| 2,987,659 | 6/61 | Teszner | 148—1.5 |
| 2,989,650 | 6/61 | Doucette et al. | 317—234 |
| 2,993,155 | 7/61 | Gotzberger | 317—234 |
| 3,035,213 | 5/62 | Schmidt | 317—234 |
| 3,040,219 | 6/62 | Fulop | 148—1.5 |

OTHER REFERENCES

IBM Disclosure Bulletin, vol. 3, No. 11, April 1961, page 32.

I.B.M. Journal of Research and Development, vol. 4, No. 3, July 1960, pp. 264–268.

DAVID J. GALVIN, *Primary Examiner.*

WINSTON A. DOUGLAS, GEORGE N. WESTBY, *Examiners.*